United States Patent
Van Asbrouck

(10) Patent No.: US 9,389,016 B2
(45) Date of Patent: Jul. 12, 2016

(54) METHOD FOR DRYING SEED

(75) Inventor: Johan Van Asbrouck, Phichit (TH)

(73) Assignee: RHINO RESEARCH EUROPE B.V., Aalten (NL)

( * ) Notice: Subject to any disclaimer, the term of this patent is extended or adjusted under 35 U.S.C. 154(b) by 644 days.

(21) Appl. No.: 13/810,658

(22) PCT Filed: Jul. 14, 2011

(86) PCT No.: PCT/NL2011/050512
§ 371 (c)(1),
(2), (4) Date: Mar. 26, 2013

(87) PCT Pub. No.: WO2012/008835
PCT Pub. Date: Jan. 19, 2012

(65) Prior Publication Data
US 2013/0212902 A1    Aug. 22, 2013

(30) Foreign Application Priority Data
Jul. 16, 2010    (EP) .................................... 10169901

(51) Int. Cl.
*F26B 5/16* (2006.01)
*A01C 1/00* (2006.01)
*A23B 9/08* (2006.01)
*A23B 9/30* (2006.01)
*B01J 20/18* (2006.01)

(52) U.S. Cl.
CPC ... *F26B 5/16* (2013.01); *A01C 1/00* (2013.01); *A23B 9/08* (2013.01); *A23B 9/30* (2013.01); *B01J 20/186* (2013.01)

(58) Field of Classification Search
CPC ......... F26B 5/16; F26B 2200/06; A01C 1/00; A23B 9/08; A23B 9/30; B01J 20/186
See application file for complete search history.

(56) References Cited

U.S. PATENT DOCUMENTS 6,638,429 B1 * 10/2003 Bussmann ............ C02F 11/008
                                                            210/669
2004/0040173 A1    3/2004 Kruithof et al.

OTHER PUBLICATIONS

Alikhani et al., "Adsorption Drying of Corn in Zeolite Granules Using a Rotary Drum", Drying Technology (1992) 10(3):783-797.
International Search Report for PCT/NL2011/050512, mailed Oct. 28, 2011, 2 pages.

* cited by examiner

*Primary Examiner* — Jiping Lu
(74) *Attorney, Agent, or Firm* — Morrison & Foerster LLP

(57) ABSTRACT

Methods for drying seeds comprising: a) contacting seeds with zeolite particles and allowing said zeolite particles to take up moisture from said seeds; or b) passing an airflow over zeolite particles, thereby allowing said zeolite particles to dry the air in said airflow and passing said dried airflow over the seeds; or c) placing said seeds and zeolite particles in an air-tight container and allowing said zeolite particles to take up the moisture evaporated by said seed.

13 Claims, 3 Drawing Sheets

METHOD FOR DRYING SEED

CROSS-REFERENCE TO RELATED APPLICATIONS

This application is the national phase of PCT application PCT/NL2011/050512 having an international filing date of 14 Jul. 2011, which claims benefit of European patent application No. 10169901.5 filed 16 Jul. 2010. The contents of the above patent applications are incorporated by reference herein in their entirety.

FIELD OF THE INVENTION

The present invention relates to methods for improving seed quality. More in particular, the present invention relates to methods for drying seed using zeolites as a moisture absorbent material.

BACKGROUND OF THE INVENTION

The moisture content of seeds for sowing, or sowing seeds, plays a crucial role in the quality of these seeds and the control of their deterioration. Despite the fact that this is generally accepted, the technology used for the drying of sowing seeds is mostly still based on circulating heated air streams through the seed lots. The dedicated seed drying equipment available and based on this technology is technologically advanced and costly. With respect to seeds for consumption, also quality characteristics must be preserved in order to preserve taste and nutritional value. For brewing barley, for instance, it is very important that the germination characteristics of the seeds are not diminished by, for instance, fungal attack.

An important consideration in the drying of seeds is that germination capacity and longevity (shelf life) of the seed must be maintained. The germination capacity refers to the percentage of seeds that after a defined period under optimum storage conditions germinate and develop into a full seedling. Germination capacity is determined with a representative sample of the seed. It has been found that the extent of the drying process influences the germination capacity in so far that excessive drying often results in loss of vitality. Insufficient drying, however, results in molding of the seeds when stored. More importantly, each type of seed has its own optimal conditions for drying. It has proven very difficult to produce drying conditions that work very well for a wide variety of seeds.

Although sowing seeds produced by seed companies are generally of a very high quality, the majority of the sowing seeds used in the world are "farm saved seeds", and their quality differs from season to season. At harvest, moisture content of the seeds is in most cases not optimal and the moisture content within a seed lot is usually not homogeneously distributed due to differences in the field and different levels of maturity of seeds on the plants.

Farm saved seeds or "farmer seeds" are usually stored for several months before they are sown. When stored in countries with a high humidity and high temperatures, 80% of the seeds will be dead or useless in the sowing procedure, and drying is necessary to avoid germination. Large postharvest losses are due to improper drying and germination of kernels. In particular small farmers are in need of suitable seed drying methods in order to improve the quality of stored seeds.

There are presently no methods available with which small farmers in less industrialized areas of the world can properly dry their farm-saved seeds. The available air flow dryers are complex and expensive, and require a relatively high level of skill of the operator. Although central seed treatment facilities may be used, it is mostly far too expensive to transport the farm saved seeds of the bulk crops to central seed treatment facilities. It would be much more favourable to bring the seed treatment facilities to the farmers in order to upgrade the quality of these seeds. This requires mobile systems for seed treatment. In principle, such mobile seed treatment units should be simple and easy to operate in order to support seed treatment of farm saved seeds at farms in second and third world countries. Thus, there is a need for a simple, cheap, robust, efficient and well controllable system for drying seed that is preferably transportable and can preferably even be operated during the transportation of the seeds.

SUMMARY OF THE INVENTION

The present inventor has now developed a simple transportable (mobile) method for drying seeds that is so easy that it can in principle be performed in a bucket. The dried seed can in principle be kept in the same bucket for storage without the need of separating the seeds from the zeolites.

The invention is based on the use of zeolites, in particular zeolites particles. The problem with such desiccants is that, although they can readily be used to extract moisture from other materials, the drying process is extremely rigorous, especially when zeolite beads and wet (or high moisture content) product are placed in direct contact. Zeolite beads have successfully been applied for the drying of cooked vegetables and watery products such as wastewater sludge, and for the roasting of coffee and cacao beans. However, the plant cells in such products need not survive, in contrast to the embryo in sowing seeds or seeds for beer making. Also, seeds for consumption or for use as spice can deteriorate in quality if temperatures are excessive. In fact, the use of zeolites in the drying of sowing seeds is unknown territory. Hence, it was hitherto unknown whether it would be possible to dry seeds in a very controlled manner in a simple (preferably also mobile) and cost effective device based on strongly water absorbing zeolites, and maintaining the germination capacity.

The present inventor has found that drying of seeds with zeolites is problematic. In fact, it was found that mixing of freshly harvested seeds with fully dried zeolite beads and the subsequent absorption of moisture from the seeds by the beads results in a marked increase in the temperature of the mixture as a result of heat generated in the zeolite beads. In fact, high levels of heat are commonly generated when seeds are placed into contact with zeolite particles. Such heat, often exceeding 60-100° C., is extremely detrimental to the seed quality.

The inventor has now overcome this problem and has been able to produce dried seed with high germination capacity and long shelf life. The solution to the problem was provided by mixing seeds with premoisturized zeolite particles having a moisture content of at least 3 wt %. It was found that the initial exothermic moisture adsorption by the zeolites was most damaging, but that this heat is largely prevented when the zeolite beads are premoisturized to a moisture content of at least 3 wt. %. The advantages are that the seeds are not exposed to heat generated by zeolites during drying, that the germination capacity is not affected by this drying method, and that the germination capacity of the seeds during storage is maintained relative to prior art methods of drying under ambient conditions.

In a first aspect, the present invention provides a method for drying seeds, said method comprising the steps of:

a) mixing seeds with premoisturized zeolite particles having a moisture content of at least 3 wt. %, preferably at least 5 wt. %, more preferably at least 7 wt. %, to provide a seed-zeolite mixture, and
b) allowing said seed in said mixture to dry to a moisture content of between 2 and 12 wt %.

The seed/zeolite mixture can be prepared by mixing, blending, centrifugation, shaking or tumbling. This can be done automated using a mixer, rotor, blender, centrifuge, shaker or tumbler. Preferably a rotating drum is used, such as a concrete mixer model.

In a preferred embodiment of said method the premoisturized zeolite particles are premoisturized prior to mixing to a moisture content of between 5 and 18 wt. %, preferably to between 15 and 20 wt. %.

In a preferred embodiment of a method of the invention prior to mixing the premoisturized zeolite particles are premoisturized to between 15% to 85% of their maximum moisture content, preferably to between 20% to 85%, more preferably between 50% to 80% of their maximum moisture content.

In a preferred embodiment of said method the zeolite particles are particles that have a maximum moisture content of 20-40 wt. %, preferably a maximum moisture content of 25-40 wt. %.

In a preferred embodiment of a method of the invention the final (after drying) moisture content of said seeds is attained by stopping the drying process. This can be done by using calculating the maximum moisture uptake capacity of the zeolites and adding to the mixture just enough zeolites that the target moisture content of the seeds is reached, but no more. Hence, the final moisture content of the seeds can be attained by mixing seeds and premoisturized zeolite particles in a predetermined weight ratio, wherein the moisture absorption weight of the zeolite particles in relation to their moisture content prior to mixing is chosen such that all zeolite particles attain their maximum moisture content at the selected final moisture content of the seed.

Alternatively, the final moisture content of the seeds can be attained by separating seeds and zeolite particles at the selected final moisture content of the seed.

In a further alternative embodiment, the final moisture content of the seeds can be attained by freezing the mixture at the selected final moisture content of the seed. Freezing can for instance occur by bringing the temperature of the mixture down to below −5° C. or even below −20° C. At such temperatures, no moisture exchange from the seed to the zeolite particles occurs.

At is also possible to perform the drying step in multiple steps, i.e from a seed moisture content of 25 wt. %, down to 20 wt. % and in a subsequent step (using new premoisturized zeolite particles) down to a seed moisture content of 15 wt. %. It is also possible to add additional premoisturized zeolite particles to the dried or drying mixture in order to attain a lower moisture content of the seeds. In effect, a step of mixing seeds with premoisturized zeolite particles can be repeated until the moisture content of the seeds has reached a desired level.

In another preferred embodiment of a method of the invention the seeds are free of adhering water prior to mixing. This means that the seeds are allowed to dry to the air, or air can be blown through the seeds, or the seeds can be rolled over a water-absorbing pad prior to their addition to the mixture.

It is possible in methods of the present invention that the moisture content of the seeds is determined before, during and/or after drying, for instance by measuring the moisture content. Preferably the moisture content of the seed is measured before drying in order to determine the amount of moisture to be extracted from said seeds, and thus to determine the amount of premoisturized zeolites needed to dry the seeds.

In a preferred embodiment of a method of the invention, the mixture obtained after mixing of seeds with zeolite particles is kept in motion. The keeping in motion may be maintained until the seeds are dry.

It is further possible that the seeds and the zeolite particles are separated after drying, for instance by sieving, although it may in some instances be possible to keep the seeds and zeolites particles mixed and sow the mixture in order to produce a crop. For sieving, it is advantageous to have the zeolite particles chosen such that their average size is larger than the average size of the seeds.

In a preferred embodiment of the invention the seeds are freshly harvested seeds. It is an advantage of the present method that the drying can be performed "on farm", which term refers to the fact that the method need not necessarily be performed on an industrial scale or in an industrial setting, but may be practiced in a small scale agricultural setting, most preferably directly at the site of harvest.

The seeds that can be used in a method of the invention can in principle be any kind of seed, preferably vegetable seeds or fruit seeds, but also consumption seeds, fodder seeds or industrial crop seeds can be treated using method of the present invention. Very suitable seeds are soy seeds or rice seeds.

It is possible to perform the drying at ambient temperatures, but also elevated or reduced temperature environments are possible.

Although the method of the invention is essentially completed upon drying of the seeds to the desired moisture content, it is possible to extend the method with additional steps, such as by regenerating the zeolite particles. Regenerating in his context refers to the process of drying the zeolites in order to prepare them for a new round of seed drying. Zeolite regeneration is in particular performed by heat-treating the zeolite particles. Said regeneration is preferably performed at a temperature between 100-400° C., more preferably at a temperature between 200-250° C. In preferred embodiments of a method of the invention, the method may comprise the step of regenerating said zeolite particles by heating, preferably at a temperature between 200-400° C., more preferably 220-250° C. The regeneration step preferably is followed by a premoisturizing step, wherein the zeolite particles are moisturized with water to a moisture content of at least 3 wt. %, preferably at least 5 wt. %.

In another aspect the present invention relates to the use of zeolite particles for drying seeds.

DETAILED DESCRIPTION OF THE INVENTION

Figure 1:
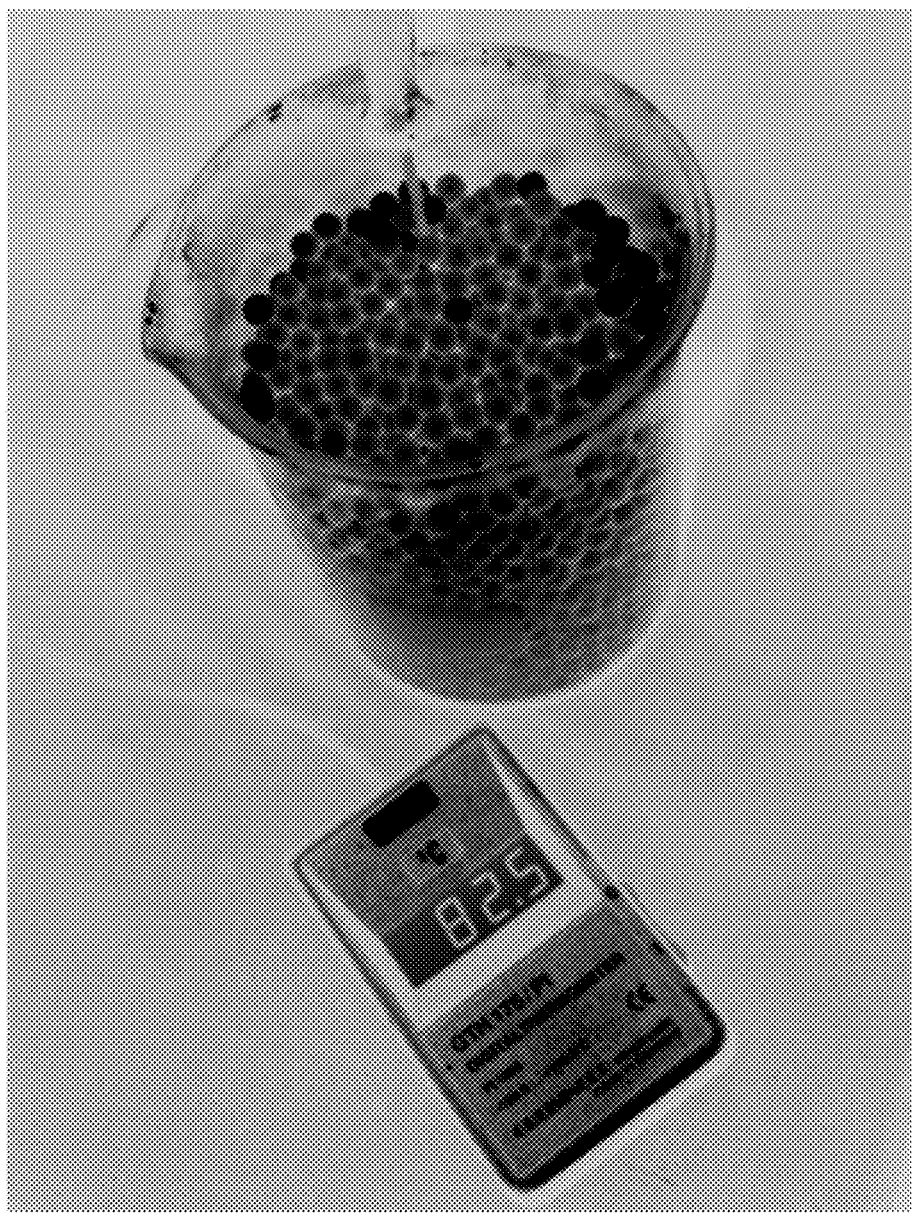
FIG. 1 shows the setup as described in Example 1.

The term "seeds" refers to any seed, like; rough seeds, coated seeds, primed seeds, pelleted seeds. In fact, as stated above, any seed can be used in a method of the invention. Particularly useful are seeds of wheat, oat, corn (mais), barley, rye, millet, rice, soy, rapeseed, linseed (flax), sunflower, carrot, black salsify, runner bean, goa bean, asparagus pea or winged bean, haricot bean, climbing bean or pole bean, snap bean, broad bean or field bean, garden pea or green pea, lupin, tomato, pepper, melon, pumpkin, cucumber, egg plant, zucchini, onion, leek, lettuce, endive, spinach, corn salad, gherkin, (red) cabbage, savoy cabbage, pointed cabbage, Chinese cabbage, pak-choi (bok choy), cauliflower, Brussels sprouts, sugar beet, beetroot, kohlrabi, chicory, artichoke, asparagus, broccoli, celeriac, celery, radish, grass and spices, coriander, peanut, sesame. Most preferably the seeds of soy and rice are used in aspects of the present invention. Seed includes reference to sowing seeds, seeds for consumption (such as rice and wheat), and seeds for use as spices (such as coriander). Preferably, seed in aspects of the invention are drawn to sowing seeds and seeds for consumption, most preferably sowing seeds. Roasted seeds may be used in aspects of the invention, but are preferably excluded in aspects hereof. In preferred embodiments of aspects of this invention the seeds are fresh seeds. In other preferred embodiments of this invention the seeds (before being dried by the method of this invention) have a moisture content of at least 3 wt. %, more preferably at least 4, 5, 6, 7, 8, 9, 10, 11, 12, 13, and 14 wt. %, or at least 15 wt. %.

The term "sowing seeds" refers to seeds for sowing, i.e. live seeds that are used for the generation of progeny plants grown from said sowing seeds when seeded in a soil or suitable growth substratum. The term sowing seeds does not cover powdered seeds not intended for sowing such as ground coffee, flour and cacao powder.

The term "zeolite" refers to a family of micro-porous hydrated aluminosilicate minerals. More than 150 zeolite types have been synthesized and 48 naturally occurring zeolites are known. Zeolites have an "open" structure that can accommodate a wide variety of cations, such as $Na+$, $K+$, $Ca2+$, $Mg2+$ and others. These positive ions are rather loosely held and can readily be exchanged for others in a contact solution. Some of the more common mineral zeolites are: Amicite, Analcime, Barrerite, Bellbergite, Bikitaite, Boggsite, Brewsterite, Chabazite, Clinoptilolite, Cowlesite, Dachiardite, Edingtonite, Epistilbite, Erionite, Faujasite, Ferrierite, Garronite, Gismondine, Gmelinite, Gobbinsite, Gonnardite, Goosecreekite, Harmotome, Herschelite, Heulandite, Laumontite, Levyne, Maricopaite, Mazzite, Merlinoite, Mesolite, Montesommaite, Mordenite, Natrolite, Offretite, Paranatrolite, Paulingite, Pentasil, Perlialite, Phillipsite, Pollucite, Scolecite, Sodium Dachiardite, Stellerite, Stilbite, Tetranatrolite, Thomsonite, Tschernichite, Wairakite, Wellsite, Willhendersonite and Yugawaralite, all of which are equally suitable for use in the present invention. An example mineral formula is: $Na_2Al_2Si_3O_{10}$-$2H_2O$, the formula for natrolite. Naturally occurring zeolites are rarely pure and are contaminated to varying degrees by other minerals, metals, quartz or other zeolites. For this reason, naturally occurring zeolites are less preferred in many applications where uniformity and purity are essential, yet such impure zeolites are very suitable for the present application.

The term zeolite includes reference to zeolite granules, zeolite beads and zeolite particles. Example of commercially available zeolites are; Linde Type A (LTA), Linde Types X and Y (Al-rich and Si-rich FAU), Silicalite-1 and ZSM-5 (MFI), and Linde Type B (zeolite P) (GIS). Other commercially available synthetic zeolites include Beta (BEA), Linde Type F (EDI), Linde Type L (LTL), Linde Type W (MER), SSZ-32 (MTT), BRZ® (clinoptilolite). All are aluminosilicates. In the method of the present invention Linde type A zeolite (NaA, KA, CaA), also referred to by the three-letter code LTA (Linde Type A) zeolites, or the 3A, 4A and/or 5A type are suitably used.

The size of the zeolite particles as used herein is not particularly limited in aspects of the present invention, although, preferably, the size of the zeolite particles is larger then the size of the seed, preferably between 1 mm and 40 mm, more preferably between 5 and 15 mm, even more preferably 5, 6, 7, 8, 10, 11, 12, 13, or 14 mm. The advantage of using zeolite particles larger than seeds is associated with the easy of separating the zeolites from the seed. Highly preferred zeolite particles have diameter of 8 mm.

In all cases zeolites can take up water directly or take up water from moisture or water vapor in the air. Zeolites can hold up to 55% or more of their weight in water. Depending on the initial moisture content of the seeds, the water-bearing capacity of the zeolite used, and the desired final moisture content of the seed, zeolites can be added to the seeds in a weight ratio of (weight zeolite versus weight seed) 100:1 to 1:100, for example, 50:1, 20:1, 15:1, 10:1, 8:1, 6:1, 5:1, 4:1, 3:1, 2:1, 1:1, 1:2, 1:3, 1:4, 1:5, 1:6, 1:8, 1:10, 1:15, 1:20, or 1:50 preferably 3:1 to 1:50. In situations where it is desired to use low amounts of zeolites (e.g. cost wise) it may be desirable that the zeolite is used for example in a weight ratio of 1:100 to 1:1000 (weight zeolite versus weight seed). Low amounts of zeolite will generally require a longer drying period, or multiple consecutive drying steps with intermittent regeneration of the zeolite in between consecutive drying steps. The above mentioned desired final moisture content of the seed (i.e. after the drying process of this invention) could be, for example, a moisture content in the range of 3-15 wt %, preferably 5-10 wt %, more preferably around 8 wt %.

In a preferred method of the invention, zeolites are used to dry seeds whereby seeds are in direct physical contact with the zeolites. However, the terms "mixture" and "mixing seeds with premoisturized zeolite particles" as used herein should be understood as also covering those embodiments wherein the zeolites are placed in a container, and wherein the container (a bag, a case, or a box each having moisture-penetrable walls) is placed in contact with the seeds (or vice versa). It is to be understood that those embodiments wherein the heat generated by the zeolite particles due to the absorption of moisture from the seeds, and wherein the seeds are in such position relative to the zeolites that said generated heat can damage the quality of the seeds, are envisioned to be an aspect of this invention, as they will benefit from the finding that the damage can be avoided by using premoisturized zeolite particles.

The drying may be performed in an open system, but is preferably performed in a container. In that way the influence from moisture present in the atmosphere on the drying process can be minimized. A "container" as used herein represents any closed or semi-closed environment suitable for holding seeds, zeolites or mixtures of the two. Examples of containers are, but are not limited to, the cargo hold of a bulk carrier, a ship container, a silo, a storage chamber, a box, a bucket or a bag. The container can be made of any material, preferably the container is a plastic or steel container.

The present inventor has now discovered a very effective method to dry seeds based on the use of zeolites.

The method of the present invention comprises contacting (or pacing in close proximity such that moisture and heat can be exchanged directly between seeds and zeolites) seeds with zeolite particles. This will result in the transfer of water (moisture) from the seeds to the zeolites. The absorption or uptake of moisture (water) by the zeolites is not an equilibrium reaction, but is essentially irreversible. The water can be liberated from the zeolites by regeneration of the zeolites. This method can very suitably be performed immediately after harvest of the seeds. Essentially a simple concrete mixer or other tumbler can be used, thereby providing a low cost efficient seed drying method that can be applied by any farmer directly after the harvest. Moreover, this embodiment can be performed during transport by mixing the seeds and the zeolites in a suitable transport container, thereby providing a very efficient mobile drying procedure. This will result in a strong reduction of the moisture content of the seeds. After drying, the seeds can be used directly (for sowing, for consumption, for processing or for sale), they can be stored, or they can be further dried until the desired moisture content is reached. The further drying step is herein characterized that the moisture content of the seeds after the further drying step is less that the moisture content after the previous drying step. For example, a first drying step could result in a reduction in moisture content from, for example, 20-25 wt. % to 10-12 wt. %. A further drying step may then be used to dry the seeds to a moisture content of, for example, 6-8 wt. %.

A desired final moisture content, which is suitable for long term storage without loss in seed quality, is for example in the range of 5-12%, preferably 6-10%, more preferably around 8%.

It was advantageously found that the amount of premoisturized zeolite added to a batch of seed, as well as the time during which the seed is exposed to premoisturized zeolite or contacted therewith, is not limited. It was observed that long term exposure of seeds to a high amount of zeolites resulted in a dry pericarp, yet did not result in a dry embryo. The resulting seeds germinated normally. Thus, without wishing to be bound by theory, it is postulated that the zeolites are unable to release the moisture bound to the embryo. Therefore there appears to be no danger of over-drying when using zeolites. Hence, the amount of zeolite may suitably be amply dosed as the chance of overdosing is minimal. Yet, the amount of zeolites may also be metered to achieve the desired level of drying after a certain period of time. For instance, if a zeolite having a water-bearing capacity of 50 wt. % is used, an amount of 20 kg of fully dried zeolite is required to lower the moisture content of 1 ton of seed by 1 wt. %.

It is however important that premoisturized zeolites are used. Premoisturized zeolites are attained by contacting commercially obtained (dry) zeolites or regenerated and essentially anhydrous zeolites with water or water vapor, such as with water vapor present in air. The zeolites may be premoisturized by directly contacting them with liquid water, but as this may result in an inhomogeneous distribution of the moisture over the zeolite, it is preferred that the premoisturization occurs controlled, such as by exposing the zeolites for a certain amount of time to air of certain humidity, to allow the zeolite particles to take op the moisture from the air. Thus, the direct use of regenerated zeolites, which are essentially anhydrous, is to be avoided in aspects of the invention.

In aspects of the invention the moisture content of the seeds can be measured before during and/or after drying, preferably before and after drying. Said moisture content can be measured using any method known in the art. Preferably said method is a method wherein a change in conductivity is measured. Dry seeds will have low conductivity compared to seeds with a high moisture content. This method is easy to use and can easily be performed by low-trained personnel and in a low-tech setting, such as a farm site. Alternatively, the moisture content may be determined by taking an aliquot from said seed, determining the weight, drying said seed in a drying oven, and determining the weight-loss due to drying, thereby providing a measure for the moisture content.

In preferred embodiments of a method of the invention, the moisture content of the seeds is determined prior to their mixture with the premoisturized zeolites and then a target moisture content is determined. The amount of premoisturized zeolites is then selected such that the amount of moisture to be removed from the seeds can be taken op by the zeolites. The amount of zeolites may be limiting, resulting in a moisture content of the seeds above their minimum attainable level of about 3-5 wt %, or the zeolites may be added in excess, such that the seed moisture content is lowered to a level of about 3-5 wt %. It was particularly surprising that at this level, the seeds still exhibited high germination capacity.

After the transfer of the water to the zeolite, the zeolite can be separated from the dried material. This further embodiment of the method of the invention can be performed using any known method in the art, for example, separation can be performed by centrifugation. In a preferred embodiment of the present invention said separation is performed by sieving. The term "sieving" refers to the separation of a mixture of various-sized particles into two or more portions, by passing through screens of specified mesh, net or other filtration methods. Sieving can also be performed using sieving machines that are well known in the art. In general, a sieve separates desired elements from undesired material. Preferably seeds and zeolites are of a different size thereby allowing an efficient separation by using sieves. Preferably the size of the zeolite particle is larger then the size of the seed. More preferably the size of the zeolites is chosen such that a complete separation of zeolites from seeds is possible by using a sieve. Preferably the size of the zeolite particles is between 0.1 mm and 20 mm, more preferably between 1-5 and 15 mm, even more preferably said size is 6, 7, 8, 9, 10, 11, 12, 13 or 14 mm, most preferably 8 mm. Although it is preferred to separate dried seeds form zeolites, it is also possible to use the seeds without separation.

The mixture can be held static, meaning that the seeds and the zeolites are added without any further agitation of the mixture, or the mixture can be held in motion. The mixture may for instance be held in motion by using mixers, rotors, blenders, shakers or tumblers.

In a further embodiment of the invention the zeolites can be regenerated by heating, and reused. Regeneration can be performed after each drying step of the method of the invention. For example, the zeolites can be regenerated after drying when zeolites and seeds have been separated as described above. Regeneration can be performed by heating using any known method, for example via, steam, a flame, heating via gas, an oven, or a microwave can be used. In a preferred embodiment of the invention said heating is performed using continuous microwave systems. Said regeneration can be performed at a temperature between 200-400° C., more preferably between 220-250° C.

The main advantage of the methods of the present invention is that the essential steps of improving the storability of seed can be applied directly at, or at least close to, the site of harvest, thereby allowing a rapid drying of the seeds which will result in an improved storability and an improved quality of said seeds.

EXAMPLES

Example 1

Direct Drying with Fully Dehydrated Zeolite

Zeolite particles were dried in an oven at 250° C. in order to provide fully dried zeolite. The dried zeolite particles were mixed with freshly harvested beet (*Beta vulgaris*) seeds in a container in equal weight amounts, and the temperature in the container was monitored. Very shortly, the temperature in the mixture reached a value of 90° C.

An a parallel experiment, zeolite particles were mixed with a small volume of water and the temperature in the vessel was recorded (see FIG. 1). The temperature rose to a value of over 80° C. almost immediately.

Taking into account that a temperature of 40-50° C. is lethal or very detrimental for the vigour and germination quality of seeds, it was clear that direct mixing of seeds and fully dried zeolite was not beneficial.

Example 2

Comparing Sun Drying with Zeolite Bead Drying

Chili (*Capsicum*) seeds were harvested in Thailand by a farmer (member of the TVRC—Tropical Vegetable Research Center) by traditional methods. 50% of the seeds was dried by the classical way (drying in the sun) and subsequently stored in sealed plastic containers. The other 50% of harvested seeds was dried with the method of the present invention using the zeolite particles (bead drying) and the obtained seeds were stored in an identical way.

For the classical drying system, sundrying was used (only available system in Thailand).

For the method of drying using the zeolite particles the following procedure was followed: Beads of zeolite with an average diameter of 8 mm were used. The beads were dried in an oven for 3 hours at 250° C., after which the beads had a maximum moisture absorption capacity of 27 wt. %. Beads were subsequently premoisturized to a moisture content of 5 wt. %, bringing the maximum moisture absorption capacity of these beads to 22 wt. %. Seeds and beads were mixed and stored in sealed plastic containers.

The moisture content of both sun-dried and bead-dried samples was measured before and after the drying process. A total of four repetitions were measured and the official ISTA (International Seed Testing Association) method was used for determining the moisture content.

The following results were obtained: Before drying, the seeds had a moisture content of 24 wt. % (dry extraction method). After drying, and during storage, the moisture contents as displayed in Table 1 were determined.

TABLE 1

Moisture content (in wt. % water) of seeds dried by two different methods.

|  | Sun-drying | | | Bead-drying | | |
| --- | --- | --- | --- | --- | --- | --- |
|  | Min | Max | Average | Min | Max | Average |
| Directly after drying | 9.2 | 10 | 9.6 | 5.5 | 5.9 | 5.7 |
| 2 months after drying | 9.2 | 9.6 | 9.4 | 5.7 | 5.8 | 5.7 |
| 4 months after drying | 9.2 | 9.3 | 9.3 | 5.8 | 5.4 | 5.6 |
| 6 months after drying | 9.3 | 9.4 | 9.3 | 5.9 | 5.8 | 5.9 |

Figure 2:
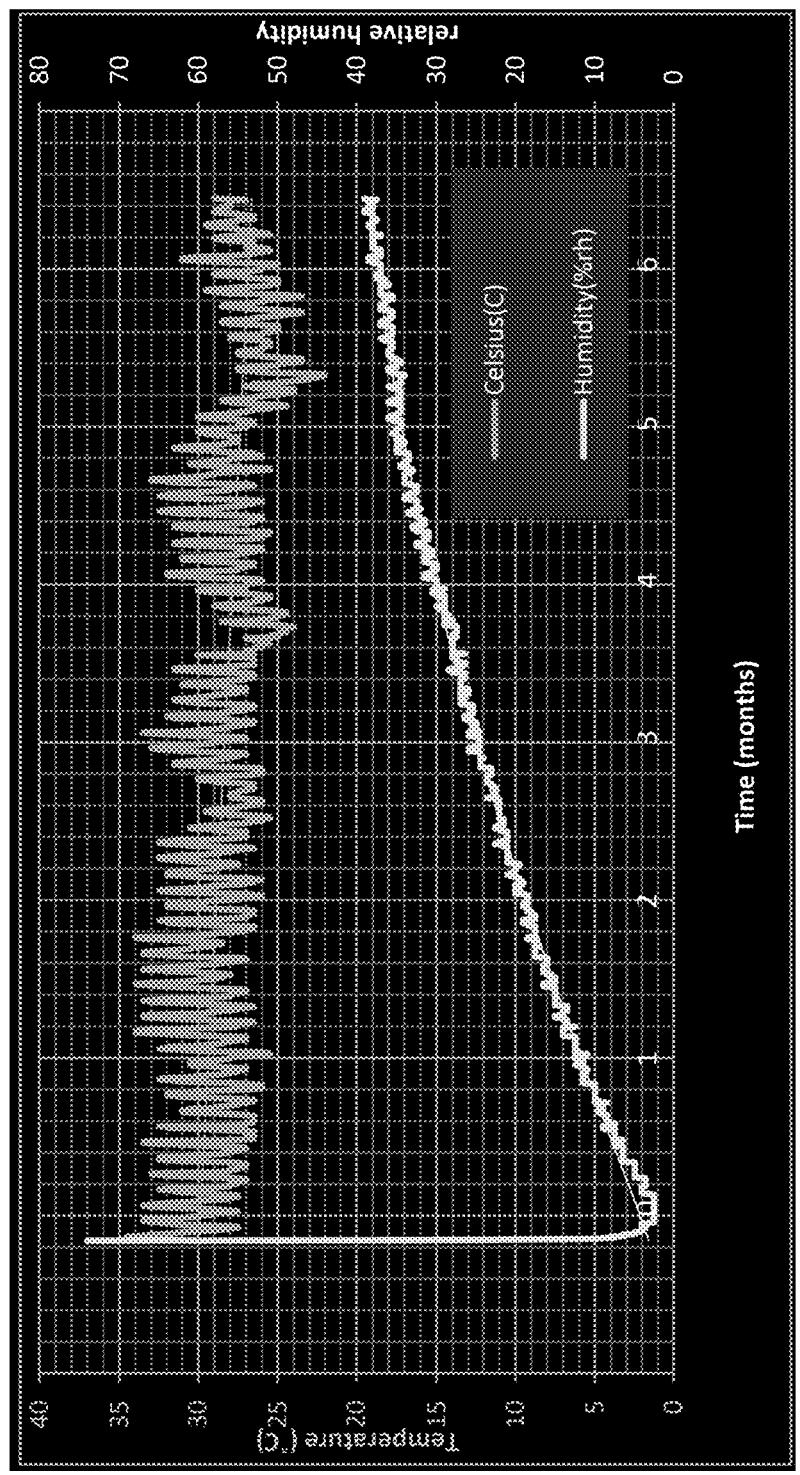
FIG. 2 shows the moisture content and temperature in a container of seeds during and after drying with zeolite particles as described in Example 2.

In one sealed container of bead-dried seeds, the relative humidity of the air was recorded during the storage. The fact that the relative humidity (rH) was increasing over the course of months, indicated that the beads had reached their maximum moisture uptake capacity, i.e. that there absorption capacity was fully used, and that the air in the container equilibrated with the residual moisture in the seeds (See FIG. 2).

The quality difference between the two samples was remarkable. Table 2 summarizes some of the results. Germination under controlled laboratory conditions was determined by the methods prescribed by the ISTA as indicated above. Soil emergence was also tested, as well as the weight of the plantlets after 20 days.

TABLE 2

Germination (in % seeds germinating) and soil emergence (in % seeds emerging) of seeds dried by two different methods and subsequently stored as described above.

|  | Sun-drying | Bead-drying |
| --- | --- | --- |
| Germination (%) immediately after drying | 92.9 | 91.2 |
| Germination (%) after 6 months | 29.5 | 86.4 |
| Soil emergence (%) after 6 months | 54.8 | 88.1 |
| Weight (in grams) of the seedlings after 20 days | 1.74 | 2.22 |

Figure 3:
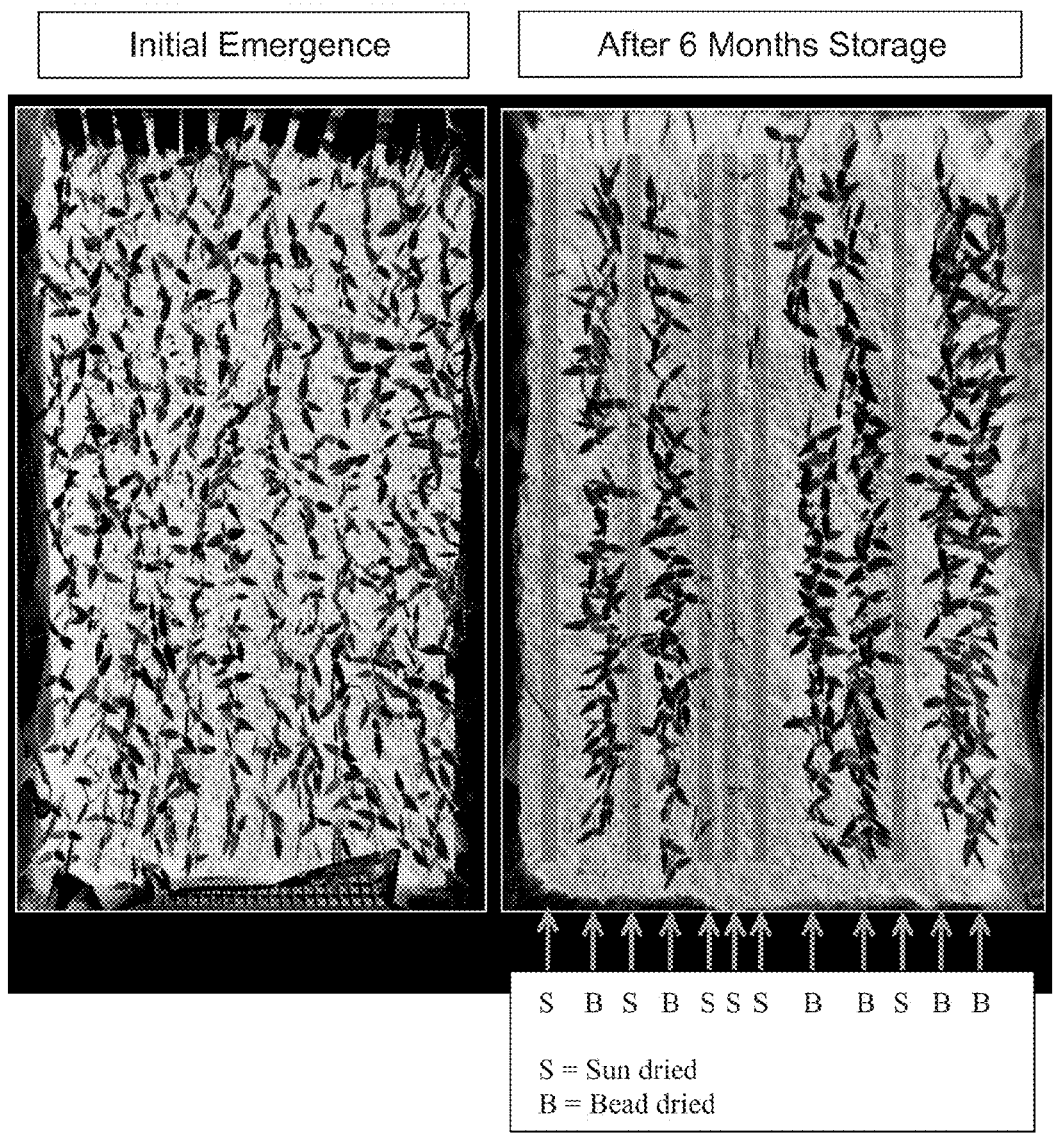
FIG. 3. Shows the effect of storage on the germination capacity of seeds dried by two different methods.

As can be seen in FIG. 3, the germination immediately after drying was good for both methods. However, the bead drying method provided far better results after 6 months of storage in a sealed container.

CONCLUSION

If the beads are pre-moisturized, the negative influence of the exothermic reaction of the beads can be avoided and seeds can be dried in a very easy way. The drying method of this invention has as major effect that the quality (for instance the germination capacity) of these seeds after storage remains very high. Furthermore, seeds dried in this way exhibit an increase in field emergence and grow more vigorously. This improves the health and subsequently the yield of plants grown from these seeds. It is further to be expected that properly dried seeds suffer less attack by fungi.

The invention claimed is:
1. A method for drying seeds, said method comprising the steps of:
   a) mixing seeds with premoisturized zeolite particles having a moisture content of between 3 and 20 wt % to provide a seed-zeolite mixture, and
   b) allowing said seed in said mixture to dry to a final moisture content of between 2 and 12 wt %.
2. Method according to claim 1, wherein said premoisturized zeolite particles are premoisturized prior to mixing to a moisture content of between 5 and 18 wt. %.
3. Method according to claim 1, wherein said zeolite particles are characterized by maximum moisture content of 20-40 wt. %.
4. Method according to claim 1, wherein said final moisture content of said seeds is attained by
   mixing seeds and premoisturized zeolite particles in a predetermined weight ratio, wherein the moisture absorption weight of the zeolite particles in relation to their moisture content prior to mixing is chosen such that all zeolite particles attain their maximum moisture content at the selected final moisture content of the seed;
   separating seeds and zeolite particles at the selected final moisture content of the seed, or freezing said mixture at the selected final moisture content of the seed.

5. Method according to claim 1, wherein said seeds are free of adhering water prior to mixing.

6. Method according to claim 1, wherein the moisture content of the seed is determined before and after drying.

7. Method according to claim 1, wherein after mixing of seeds with zeolite particles, the mixture is kept in motion.

8. Method according to claim 1, wherein the seeds and zeolite particles are separated after drying.

9. Method according to claim 1, wherein said seeds are freshly harvested seeds.

10. Method according to claim 1, wherein said seeds are rice seeds or soy seeds.

11. Method according to claim 1, further comprising the step of regenerating said zeolite particles by heating.

12. Method according to claim 11 further comprising the step of regenerating said zeolite particles by heating at a temperature between 220-250° C.

13. Method according to claim 11 further comprising the step of regenerating said zeolite particles by heating at a temperature between 200-400° C.

\* \* \* \* \*